United States Patent
Prafullchandra et al.

(10) Patent No.: US 9,734,349 B1
(45) Date of Patent: *Aug. 15, 2017

(54) HARMONIZED GOVERNANCE SYSTEM FOR HETEROGENEOUS AGILE INFORMATION TECHNOLOGY ENVIRONMENTS

(71) Applicant: HyTrust, Inc., Mountain View, CA (US)

(72) Inventors: Hemma Prafullchandra, Mountain View, CA (US); Govindarajan Rangarajan, Sunnyvale, CA (US)

(73) Assignee: HYTRUST, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,947

(22) Filed: Jul. 15, 2016

Related U.S. Application Data (63) Continuation of application No. 15/018,478, filed on Feb. 8, 2016.

(51) Int. Cl.
  *G06F 21/62* (2013.01)
  *G06F 21/55* (2013.01)
  *H04L 29/06* (2006.01)

(52) U.S. Cl.
  CPC .......... *G06F 21/6218* (2013.01); *G06F 21/55* (2013.01); *H04L 63/08* (2013.01);
  (Continued)

(58) Field of Classification Search
  CPC ..... G06F 21/6218; G06F 21/55; H04L 63/08; H04L 63/102; H04L 63/10; H04L 63/20
  See application file for complete search history.

(56) References Cited

U.S. PATENT DOCUMENTS

| | | |
|---|---|---|
| 5,944,824 A | 8/1999 | He |
| 5,994,824 A | 11/1999 | Thomas et al. |

(Continued)

FOREIGN PATENT DOCUMENTS

| | | | |
|---|---|---|---|
| KR | 2007-0112755 A | 11/2007 | |
| WO | 2005114439 A1 | 12/2005 | |

OTHER PUBLICATIONS

Takabi, Hassan, and James BD Joshi. "Policy management as a service: an approach to manage policy heterogeneity in cloud computing environment." System Science (HICSS), 2012 45th Hawaii International Conference on. (pp. 5500-5508). IEEE, 2012.*

(Continued)

*Primary Examiner* — Kari Schmidt
(74) *Attorney, Agent, or Firm* — Ascenda Law Group, PC (57) ABSTRACT

A harmonized governance system for a heterogeneous agile environment affords abstraction and normalization of resources, operations, and roles, and respective attributes and contexts of such resources, operations, and roles, of respective individual agile environments that make up the heterogeneous agile environment. Such abstraction frees administrators from having to understand and be conversant in agile environment-specific syntaxes required for management of the different agile environments, and allows for normalized reporting and auditing across them. Data sources of the harmonized governance system store information mappings that facilitate this abstraction and normalization of the agile environment-specific syntaxes and as new attributes and contexts of resources, operations, and roles of the agile environment-specific syntax are discovered they are mapped to new counterparts in a heterogeneous agile environment syntax.

13 Claims, 5 Drawing Sheets

(52) U.S. Cl.
CPC ............ *H04L 63/10* (2013.01); *H04L 63/102* (2013.01); *H04L 63/20* (2013.01)

(56) References Cited

U.S. PATENT DOCUMENTS

| | | | |
|---|---|---|---|
| 6,003,084 | A | 12/1999 | Green et al. |
| 6,178,511 | B1 | 1/2001 | Cohen et al. |
| 6,415,032 | B1 | 7/2002 | Doland |
| 8,065,714 | B2 | 11/2011 | Budko et al. |
| 8,832,784 | B2 | 9/2014 | Budko et al. |
| 9,054,971 | B2* | 6/2015 | Kumar ............... H04L 41/0893 |
| 9,256,757 | B2* | 2/2016 | Brucker ............. G06F 21/6218 |
| 2002/0069369 | A1 | 6/2002 | Tremain |
| 2002/0169987 | A1 | 11/2002 | Meushaw et al. |
| 2003/0126468 | A1 | 7/2003 | Markham |
| 2004/0030913 | A1 | 2/2004 | Liang et al. |
| 2005/0210467 | A1 | 9/2005 | Zimmer et al. |
| 2005/0257267 | A1 | 11/2005 | Williams et al. |
| 2006/0010497 | A1 | 1/2006 | O'Brien et al. |
| 2006/0026688 | A1 | 2/2006 | Shaha |
| 2006/0190532 | A1 | 8/2006 | Chadalvada |
| 2006/0218267 | A1 | 9/2006 | Khan et al. |
| 2007/0022138 | A1 | 1/2007 | Erasani et al. |
| 2007/0022480 | A1 | 1/2007 | Newman |
| 2007/0056019 | A1* | 3/2007 | Allen .................. G06Q 10/06 726/1 |
| 2007/0067351 | A1 | 3/2007 | Singh et al. |
| 2007/0073858 | A1 | 3/2007 | Narayanan et al. |
| 2007/0078988 | A1 | 4/2007 | Miloushev et al. |
| 2007/0118350 | A1 | 5/2007 | Van Der Made |
| 2007/0150936 | A1* | 6/2007 | Maes .................. H04L 67/10 726/1 |
| 2007/0180493 | A1 | 8/2007 | Croft et al. |
| 2007/0261121 | A1 | 11/2007 | Jacobson |
| 2008/0034364 | A1 | 2/2008 | Lam et al. |
| 2008/0034408 | A1 | 2/2008 | Duggal |
| 2008/0098309 | A1 | 4/2008 | Fries et al. |
| 2008/0134177 | A1 | 6/2008 | Fitzgerald et al. |
| 2008/0167920 | A1 | 7/2008 | Schmidt et al. |
| 2008/0256534 | A1 | 10/2008 | Chess et al. |
| 2008/0256538 | A1 | 10/2008 | Carter et al. |
| 2009/0070771 | A1 | 3/2009 | Yuyitung et al. |
| 2009/0061146 | A1 | 5/2009 | Jeong |
| 2011/0264816 | A1* | 10/2011 | Lischka .............. G06F 21/6218 709/229 |
| 2015/0046971 | A1* | 2/2015 | Huh .................... H04L 9/3213 726/1 |
| 2015/0350212 | A1* | 12/2015 | Amiri ................. H04L 63/10 726/1 |

OTHER PUBLICATIONS

K. Gaaloul, M. E. Kharbili and H. A. Proper, "Secure governance in enterprise architecture—Access control perspective," 2013 3rd International Symposium ISKO-Maghreb, Marrakech, 2013, pp. 1-6.*

M. Petkac, L. Badger and W. Morrison, "Security agility for dynamic execution environments," DARPA Information Survivability Conference and Exposition, 2000. DISCEX '00. Proceedings, Hilton Head, SC, 2000, pp. 377-390 vol. 1.*

Pustchi, Navid, Ram Krishnan, and Ravi Sandhu. "Authorization federation in IaaS multi cloud." Proceedings of the 3rd International Workshop on Security in Cloud Computing. ACM, 2015. pp. 63-71.*

EP Application No. 09813406.7, Extended European Search Report dated Jan. 22, 2013, 8 pages.

EP Application No. 09813406.7, Reply to the Extended European search report dated Aug. 16, 2013, 12 pages.

Cisco Systems Inc.: "Cisco Application Networking Manager 1.2", Nov. 6, 2007 (Nov. 6, 2007), XP002687453, Retrieved from the Internet: URL:http://www.cisco.com/en/US/prod/collateral/netmgtsw/ps6505/ps6904/product_data_sheet0900aecd806fb1a8.pdf [retrieved on Nov. 19, 2012].

Cisco Systems Inc.: "User Guide for the Cisco Application Networking Manager 1.2", May 28, 2008 (May 28, 2008), XP002687454, Retrieved from the Internet: URL:http://www.cisco.com/en/US/docs/net_mgmt/application_networking_manager/1.2/user/guide/UserGuide.pdf [retrieved on Nov. 19, 2012].

Anna Cinzia Squicciarini et al: "Access Control Strategies for Virtualized Environments in Grid Computing Systems", Future Trends of Distributed Computing Systems, 2007 FTDCS '07. 11TH IEEE International Workshop on, IEEE, PI, Mar. 1, 2007 (Mar. 1, 2007), pp. 48-54, XP031070272, ISBN: 378-0/7695-2810-6.

Hytrust, Inc., PCT/US09/51995 filed Jul. 28, 2009, International Preliminary Report on Patentability dated Jul. 10, 2012 35 (pages).

Hytrust, Inc. et al., PCT/US2009/051995 filed Jul. 28, 2009; International Search Report and Written Opinion; ISA/KR; dated Feb. 24, 2010; 9 pages.

Hytrust, Inc. et al., PCT/US2009/051590 filed Jul. 23, 2009; International Search Report; ISA/KR; dated Feb. 23, 2010; 8 pages.

Hytrust, Inc. et al., PCT/US2009/051883 filed Jul. 27, 2009; International Search Report and Written Opiniont; ISA/KR; dated Feb. 2, 2010; 9 pages.

Charu Chaubal, VMware Infrastructure 3, Security Hardening, 2007, 19 pages, Palo Alto, USA.

Michael Hilker, Next Challenges in Bringing Artificial Immune Systems to Production in Network Security, Bionetics Dec. 10-12, 2007, 2001, Budapest, Hungary, 7 pages.

VMware ESX Server 3.x Benchmark—Version 1.0, The Center for Internet Security, Oct. 2007, 70 pages.

VMware, VMware Esx Server 3-Best Practices for VMWare ESX Server 3, VMware White Paper, Copyright 1998-2006, 13 pages, Palo Alto, USA.

National Security Agency, VMware ESX Server 3 Configuration Guide, Enterprise Applications Division of the Systems and Network Analysis Center (SNAC)—Information Assurance Directorate, Mar. 3, 2008, 26 pages, Ft. Meade, USA.

Intel Technology Journal, Autonomic Computing, vol. 10, Issue 04, Published Nov. 9, 2006, 84 pages.

Marvin McNett, Diwaker Gupta , Amin Vandat , Geoffrey M. Voelker, Usher: an extensible framework for managing clusters of virtual machines, Proceedings of the 21st conference on Large Installation System Administration conference, p. 1-15, Nov. 11-16, 2007, Dallas.

Almutairi; et al., "A Distributed Access Control Architecture for Cloud Computing", IEEE Software (Mar./Apr. 2012), pp. 36-44.

Ferraiolo; et al., "A Comparison of Attribute Based Access Control (ABAC) Standards for Data Services", National Institute of Standards and Technology (Dec. 2015), Draft NIST Special Publication 800-178, 57 pgs.

Khan, "Access Control in Cloud Computing Environment", ARPN Journal of Engineering and Applied Sciences (May 2012), 7(5):613-15.

Mang; et al., "Cloud computing: state-of-the-ad and research challenges", J Internet Serv Appl (2010), 1:7-18.

Marvin McNett Diwaker Gupta , Amin Vandat, Geoffrey M. Voelker, Usher: an extensible framework for managing clusters of virtual machines, Proceedings of the 21st conference on Large Installation System Administration Conference, p. 167-181, Nov. 11-16, 2007, Dallas.

Mell; et al., "The NIST Definition of Cloud Computing", National Institute of Standards and Technology (Sep. 2011), Special Publication 800-145, 7 pages.

\* cited by examiner

HARMONIZED GOVERNANCE SYSTEM FOR HETEROGENEOUS AGILE INFORMATION TECHNOLOGY ENVIRONMENTS

RELATED APPLICATIONS

This is a CONTINUATION of U.S. application Ser. No. 15/018,478, filed Feb. 8, 2016, incorporated herein by reference.

FIELD OF THE INVENTION

The present invention is directed to methods and systems for centralizing the administration, control, and governance of heterogeneous agile information systems and information technology environments.

BACKGROUND

So-called agile environments, such as virtualized, cloud-based (e.g., private, hybrid, public), and other environments defined, provisioned/de-provisioned and managed by software, just-in-time or rapidly, need to be properly secured against unauthorized access/exploitation, and should have suitable security measures in place to ensure business continuity, compliance, and governance by proactively mitigating risks/threats resulting from both malicious attacks and inadvertent errors. One such measure is to have rich, fine-grained authorization policies in place (e.g., role-based access controls and/or attribute-based access controls) to suitably limit/restrict administrative access to resources and operations on them, where an administrator may be a human, a computer system, or combinations of both. Existing security platforms and cloud management platforms offer such abilities, although in limited form. For example, existing systems are restricted to use with environments that are homogeneous in nature, where an enterprise relies only on one cloud virtualization technology and/or only one cloud provider for all its needs.

Recently, however, enterprises have moved away from homogenous environments towards heterogeneous and/or multi-cloud environments. Such trends in resource deployment reflect the fact that cost savings, operational efficiency, security, availability, and reliability are all enhanced through such means. In addition, emerging technologies such as application containers and software defined networking (SDN) further simplify the adoption of hybrid (e.g., multi-cloud) environments.

The trend to using heterogeneous agile environments has created a new set of challenges for administrators and auditors. With respect to managing authorization policies, administrators must now understand the different tools used to manage such environments and suitably configure authorization policies using such tools. Because the different environments employ different user interfaces, application programming interfaces, and resources, the administrator's task is made significantly more complex than when homogeneous environments were the norm. To make matters worse, there tends to be no consistency in terminology or representation of any given resource across different agile environments. For example, a virtual machine so termed in one environment may be classified as a server in another. An inexperienced administrator may fail to recognize these entities perform similar functions and, accordingly, may leave one or the other exposed or unusable through improper configuration. Further, operations that can be performed on resources may not be the same across the different environments, and, even where they are the same, the operations may be named differently, again presenting difficulties for the administrator. As if this were not complex enough, the granularity of the operations that can be performed on different or even similar resources in different environments may diverge significantly, such that consistent separation of duties may not be achievable or overly complex to configure correctly.

SUMMARY

In various embodiments, a harmonized governance system for a heterogeneous agile environment includes a computer-based policy administration element (PAE) communicatively coupled to respective management platforms of a plurality of individual agile environments that make up the heterogeneous agile environment. The PAE is configured to administer and report governance policies, including rules, roles and assignment to resources of the heterogeneous agile environment according to abstracted and normalized (i) representations of the resources, (ii) operations capable of being performed by and on said resources, and (iii) roles assignable to subjects that will interact with said resources, and (iv) respective attributes of said representations, operations and roles. The harmonized governance system also includes a computer-based policy decision element (PDE) communicatively coupled to receive indications of attempted governance operations by one or more subjects to resources within the individual agile environments that make up the heterogeneous agile environment. The PDE is configured to determine and report whether the attempted governance operations should be permitted or not. The harmonized governance system also includes one or more data sources accessible to the PAE and the PDE storing information about (i) the one or more subjects and respective attributes thereof, and (ii) resources of the heterogeneous agile environment and respective attributes of said resources. The harmonized governance system further includes a computer-based policy enforcement element (PEE) communicatively coupled to the respective management platforms and resources of the individual agile environments that make up the heterogeneous agile environment. The PEE is configured to enforce and report authorization decisions of the PDE.

Different respective ones of the individual agile environments that make up the heterogeneous agile environment have individual, associated access policies for resources within the respective individual agile environments. Each respective individual agile environment has an associated, respective access control system for subjects, resources, and operations of the respective individual agile environment; and the resources of each respective individual agile environment comprise one or more of compute systems, network systems, application containers, application systems, management systems, and storage systems.

For each of the respective ones of the individual agile environments that make up the heterogeneous agile environment, the computer-based PAE maintains harmonized mappings of:

a. the abstracted and normalized representations of the resources, and respective attributes of said resources, of the respective individual agile environments and corresponding equivalent virtualized agile environment-specific resources, said mappings stored in the one or more data stores;

b. the abstracted and normalized operations, and respective attributes of said operations, capable of being performed by said resources of the respective individual agile environments and corresponding equivalent agile environment-specific operations, said mappings stored in the one or more data stores; and c. the abstracted and normalized roles, and respective attributes of said roles, assignable to subjects that will interact with said resources of the respective individual agile environments and corresponding equivalent agile environment-specific roles, said mappings stored in the one or more data stores.

The abstracted and normalized roles may map to abstracted operations capable of being performed by the resources of the respective individual agile environments.

In further embodiments of the invention, a harmonized governance system for a heterogeneous agile environment that includes a number, n, of individual agile environments, each including one or more compute systems, network systems, application containers, application systems, management systems, and storage systems, receives an indication of an attempted operation concerning a resource of a first one of the individual agile environments. The indication of the attempted operation concerning the resource is mapped from an agile environment-specific language of the first one of the individual agile environments to an abstracted, normalized language of the heterogeneous agile environment. The harmonized governance system of the heterogeneous agile environment makes a decision whether to allow or not allow the attempted operation, and the decision is translated from the abstracted, normalized language of the heterogeneous agile environment to a command in the agile environment-specific language of the first one of the individual agile environments. That command is then transmitted in the agile environment-specific language of the first one of the individual agile environments to a management platform of the first one of the individual agile environments for execution thereby. The abstracted, normalized language of the heterogeneous agile environment may include abstracted, normalized representations of subjects, resources, and operations, where subjects are actors that can perform one or more operations on a resource, resources are compute, network, storage, application containers, or application systems in an agile environment, and operations are actions performed on or by a resource.

The attempted operations concerning resources of the n individual agile environments may be reported (e.g., via a dashboard or other means) in the abstracted, normalized language of the heterogeneous agile environment to an administrator of the harmonized governance system. The indication of the attempted operation concerning the resource of the first one of the individual agile environments may be an indication of an action to be performed on or by the resource. Further, making the decision whether to authorize or not authorize the attempted operation may involve determining whether policies governing the attempted operation concerning the resource permit said attempted operation. Such policies may be one or more of governance policies, role-based access control policies, attribute-based access control policies, placement-policies, and relationship policies.

These and further embodiments of the invention are described in greater detail below.

DETAILED DESCRIPTION

Dealing with a myriad of tools, and more importantly, the isolated nature of the tools and the inability to have a common/consistent set of authorization policies across multiple, heterogeneous agile environments may lead to poor or improper configurations of the environments and their respective resources. This makes such environments and their resources easier targets for exploitation. To address such problems, herein are provided methods and systems for centralizing the administration and control of heterogeneous agile information systems and information technology environments.

To better allow the reader to appreciate the present methods and systems, the following terms are used in this description and the claims that follow. An agile information system or agile information technology environment (referred to collectively herein as an agile environment) is one that is characterized by instantaneous (or near instantaneous) and dynamic changes made by multiple subjects with service requests and security authorization for such service requests requiring similar instantaneous (or near instantaneous) and dynamic responses in an automated manner. Agile environments include virtualized computing environments made up of a plurality of virtualized computing systems, with or without associated networking and storage resources, software defined network (SDN) environments, virtualized network functions, application container technologies, and storage and application environments. In such contexts, a subject is an entity making a request or performing an operation on an object, where the subject may be a human or a non-person entity (NPE) such as an autonomous service, script or application running on a computer system. In some instances, a subject may be referred to as a requesting entity. An operation is an action to be performed on an object.

Each agile environment is composed of logical objects (sometimes referred to as resources), which are entities to be protected from unauthorized use/access. Objects may be compute objects, network objects, storage objects, or application objects. Each object has a set of attributes (object attributes or resource attributes) that help describe and identify it. Object attributes are typically bound to their objects through a convenient means of assured association. Likewise, subjects have associated subject attributes, which may comprise a unique identity that distinguishes a subject from all others.

As mentioned above, authorization policies and associated access controls are typical means used to restrict access to objects. Access control is a decision to permit or deny a subject access to objects and is synonymous with authorization. To that end, privileges represent authorized behavior of a subject, and are embodied in policies or rules. Thus, policies govern authorized behaviors of subjects based on their privileges and the protections accorded to objects. In general, there are two flavors of authorization policies, namely role based access controls (RBAC) and attribute based access controls (ABAC). The former simply relies on subject's role to determine whether an operation should be permitted or denied. Whereas in the latter, both the subject's and the object's attributes and context are leveraged to determine the authorization. Such attributes include classification, purpose, and location; and contexts include current risk posture and health.

As explained further below, authorization policies of each agile environment are typically enforced or implemented through an associated access control system (ACS). Such access control systems assemble authorization information, which may include information about the object being protected, the subject requesting access, the policies governing access to the object, and any contextual information needed to make a decision, and evaluate that information to render decisions. In some instances, the information will be gathered by a policy administration element (PAE), the decision rendered by a policy decision element (PDE), and the decision enforced by a policy enforcement element (PEE). Contextual information, where needed, may be obtained using identity and access management systems (in the case of subjects) and cloud management systems (in the case of objects). In various instantiations, an ACS may incorporate some or all of this functionality, and the term is used throughout this description. The present invention provides an ACS that is cloud management system agnostic to facilitate uniform centralized management of authorization policies across heterogeneous agile environments.

Figure 1:
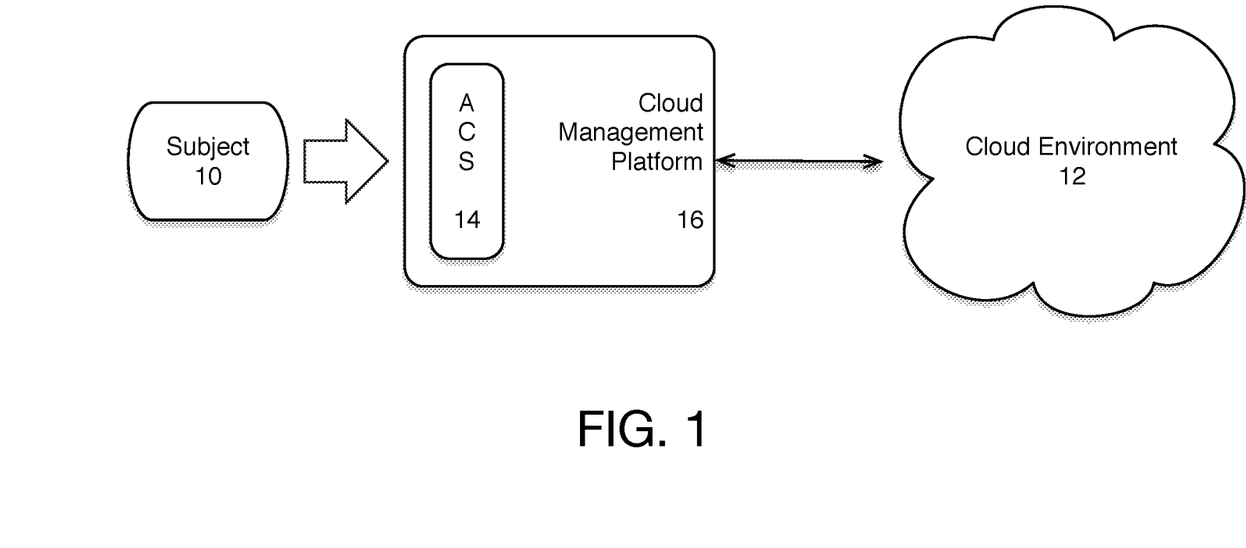
FIG. 1 depicts an example of a subject's interaction with a cloud resource via a conventional access control system of a cloud management platform.

FIG. 1 illustrates an example of a subject's 10 interaction with a cloud resource 12 via a conventional access control system 14 of a cloud management platform 16. In this example, a single cloud resource is being managed via ACS 14. Accordingly, service requests by subject 10 may be sent via ACS 14 and credentials and/or access rights of subject 10 may be verified by ACS 14 to determine whether or not the service requests should be passed on to cloud management platform 16 for implementation. Cloud resource 12 may be regarded as a physical and/or virtualized system, a cloud computing system (e.g., private, hybrid, and/or public cloud computing system), a system supporting multi-tenant applications, or any other system with resources that are provisioned, released (e.g., de-provisioned), and remotely managed by software as needed (e.g., just-in-time), including containerized systems, software-defined systems, and/or any combination thereof. It may be beneficial to view cloud resource 12 as an agile environment that changes rapidly and dynamically to handle (self-) service requests by multiple users. Examples of a such systems are described in U.S. patent application Ser. No. 13/717,511, entitled "Intelligent Security Control System for Virtualized Ecosystems," hereby incorporated by reference in its entirety. A virtualized system has a virtual version of a resource, such as computer hardware, operating system, storage device, computer network, applications, and/or any combination thereof. A multi-tenant application is an instance of software that runs on a computer system and handles service requests by multiple client-organizations. With a multi-tenant architecture model, the multi-tenant application may be designed to logically partition data and customize a configuration of the application, such that each client organization experiences a customized virtual application, and demonstrates adequate separation of their systems and access.

Cloud computing is a model for enabling ubiquitous, convenient, on-demand network access to a shared pool of configurable computing resources (e.g., networks, network bandwidth, servers, storage, application, and services) that can be rapidly provisioned and released with minimal management effort or service provider interaction. The National Institute of Standards and Technology (NIST) defines cloud computing in the "The NIST Definition of Cloud Computing," Special Publication 800-145, September 2011, by Peter Mell and Timothy Grace, and is hereby incorporated by reference in its entirety. Characteristics of the cloud computing system may include, but are not limited to, any of the following: on-demand self-service, broad network access, resource pooling, rapid elasticity, and measured service. On-demand self service allows for provisioning of computing capabilities, such as server time and network storage, as needed without requiring human interaction with the service provider. Broad network access refers to capabilities available over the network and access through mechanisms that promote use by heterogeneous thin or thick client applications (e.g., on mobile phones, tablets, laptops, and/or workstations). The cloud computing system provider may pool computing resources to serve multiple consumers (e.g., users from organizations) using the multi-tenant model, with different physical and virtual resources dynamically assigned and reassigned according to consumer demand. Capabilities may be elastically provisioned and released, in some cases automatically, to scale rapidly outward and inward commensurate with demand. Cloud systems may automatically control and optimize resource use by leveraging a metering capability (e.g., pay-per-use or charge-per-use basis). Resource usage can be monitored, controlled, and reported, providing transparency for the provider as well as the consumer of the service.

Cloud computing systems service models, may include, but are not limited to, the following: software as a service (SaaS), platform as a service (PaaS), and infrastructure as a service (IaaS). SaaS provides the consumer with the capability to use the service provider's applications running on a cloud infrastructure. The cloud infrastructure may be a collection of hardware and software, and can be viewed as containing both a physical layer and an abstraction layer. The physical layer may consist of hardware resources to support the cloud services. The abstraction layer is deployed across the physical layer and may have one or more of the cloud computing characteristics. The applications of SaaS may be accessible from various client devices, such as a thin client (e.g., a web browser) or a program interface. In some embodiments of SaaS, the consumer does not manage or control the underlying cloud infrastructure with the optional exception of application configuration settings. PaaS provides the consumer with the capability to deploy onto the cloud infrastructure consumer-related or acquired applications created using programming languages, libraries, services, and/or other tools provided by the provider. In some embodiments of PaaS, the consumer does not manage or control the underlying cloud infrastructure, but the consumer may have control over the deployed applications and optionally configuration settings. IaaS provides the consumer with the capability to provision processing, storage, networks, and other fundamental computing resources. The consumer is able to deploy and run arbitrary software, such as operating systems and applications. In some embodiments of IaaS, the consumer may not manage or control the underlying cloud infrastructure and may have control over operating system, storage, and deployed applications; and optionally control over networking components (e.g., firewalls). The cloud computing systems may be private clouds, community clouds, public clouds, hybrid clouds, and/or any other type of cloud. The private cloud infrastructure is provisioned for a single organization comprising multiple consumers (e.g., business units). The community cloud infrastructure is provisioned for use by a specific community of consumers from organizations that have shared concerns (e.g., mission, security requirements, policy, and/or compliance considerations). The public cloud infrastructure is provisioned for use by the general public. The hybrid cloud infrastructure is a composition of two or more distinct cloud infrastructures (private, community, or public) that remain unique entities but are bound together by standardized or proprietary technology that enables data and application portability (e.g., cloud bursting for load balancing between clouds).

Figure 2:
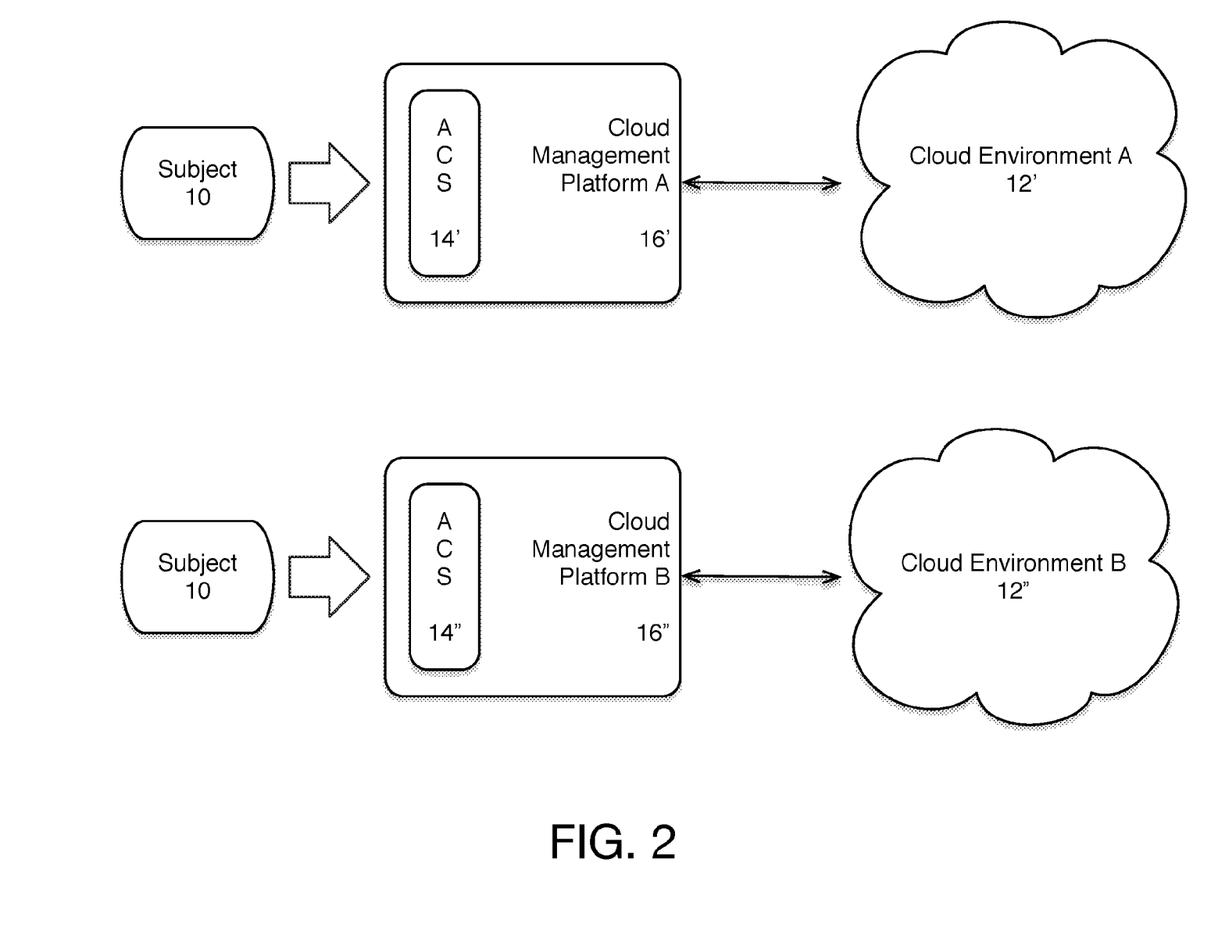
FIG. 2 depicts an example of a subject's interaction with heterogeneous cloud resources A and B via conventional access control systems of respective cloud management platforms.

FIG. 2 illustrates an example of the subject's 10 interaction with heterogeneous cloud resource A 12' and B 12" via respective conventional access control systems 14' and 14" of cloud management platforms 16' and 16". In this example, the different cloud resources are managed via separate ACSes 14' and 14". Accordingly, service requests by subject 10 can only be sent via the respective ACS for the respective cloud resource. This means that an administrator is forced to understand the ACSes and cloud management platforms used to manage the different cloud resources and must endeavor to suitably configure authorization policies of the different environments using different user interfaces and/or application programming interfaces, as appropriate. Thus, the administrator's task is significantly more complex than with respect to the situation of a single (or multiple homogeneous) cloud resource.

An example helps to illustrate the complexity involved with as few as three different cloud resources. Consider a situation involving a virtual machine administrator (VMAdmin) role used to define a set of permissions associated with a given VM administrator of a cloud resource. This would typically include capabilities such as creating a VM, shutting down a VM, etc. Assuming the enterprise has both on premise VMs created thru VMWare's VirtualCenter™ and VMs in a public cloud (e.g., one available through the Amazon Web Service™, or one administered using the OpenStack™ operating system), the administrator will have to be conversant with all of the following to administer this VMAdmin role.

With respect to the on premise VMs, the administrator will need to use a VMWare vSphere™ client user interface (UI) or application programming interface (API) to create a suitable role in VirtualCenter™ and assign it the necessary privileges. To determine the necessary privileges, the administrator will have to understand the operations the VMAdmin role will be allowed to perform and, more importantly, how that role and the operations are represented in the VirtualCenter™ environment. For example, to create a virtual machine, the corresponding VMware equivalent API is CreateVM_Task and the corresponding privileges required to perform this operation are: VirtualMachine.Config.Modify, VirtualMachine.Inventory.Create.

In the case of configuring access controls for VMs on Amazon Web Services (which are called EC2 instances), the administrator will have to use the Identity and Access Manager UI or the AWS command line interface (CLI) to configure the role and permissions suitably as defined by AWS. In the case of VMs running in a cloud resource that is administered using the OpenStack™ cloud operating system, the administrator will have to create roles using the OpenStack KeyStone™ service, and then edit a policy configuration file called policy .json for the given service (e.g., compute(nova)). In the policy .json file, one has to understand the operations which are OpenStack specific and assign the role with the relevant operations. For this example, the entry to be added to allow the VIAdmin role to create VMs is "Compute:Create":"VIAdmin". One can see that this gets even more complicated as additional management platforms are added.

To alleviate the difficulties that come with managing multiple, individual agile environments (such as cloud resources 12, 12', and 12"), the present invention provides a harmonized governance system that includes a computer-based policy administration element (PAE) communicatively coupled to respective management platforms of the various individual agile environments. The individual agile environments may thus be regarded as resources of an overall heterogeneous agile environment. The PAE of the heterogeneous agile environment is configured to administer and report governance policies, including rules, roles and assignment to the resources of the heterogeneous agile environment according to abstracted and normalized (i) representations of the resources, (ii) operations capable of being performed by and on said resources, and (iii) roles assignable to subjects that will interact with said resources, and (iv) respective attributes of said representations, operations and roles. Note that whereas the individual agile environments may be regarded as resources of the heterogeneous agile environment, each of those individual agile environments also has resources of its own and the governance policies administered by the PAE of the heterogeneous agile environment may abstract and normalize representations, operations and roles at the level of the individual agile environments as well as at the level of the resources of the individual agile environments.

The present harmonized governance system also includes a computer-based policy decision element (PDE) communicatively coupled to receive indications of attempted governance operations by one or more subjects to resources within the individual agile environments that make up the heterogeneous agile environment. The PDE of the harmonized governance system is configured to determine and report whether such attempted governance operations should be permitted or not.

Further, the harmonized governance system includes one or more data sources accessible to the PAE and the PDE. The data sources, which may in some instances be databases, memories, or more transitory storage elements such as caches, store information about (i) the one or more subjects and respective attributes thereof, and (ii) resources of the heterogeneous agile environment and respective attributes of said resources (and, in some instances, compute, storage, networking and other resources of the individual agile environments and attributes thereof). This information includes mappings of the abstracted and normalized representations of the individual agile environments and their respective resources, as well as respective attributes thereof, and corresponding equivalent agile environment-specific resources.

A computer-based policy enforcement element (PEE) may be communicatively coupled to the respective management platforms and/or resources of individual agile environments that make up the heterogeneous agile environment. Such a PEE may be configured to enforce and report authorization decisions of the PDE.

As discussed above, the different respective ones of the individual agile environments that make up the heterogeneous agile environment each have associated access policies for their respective resources. Moreover, each individual agile environment has an associated, respective access control system for its users, resources, and operations. Further, the resources of each respective individual agile environment may include one or more compute systems, network systems, management systems, application containers, application systems, and/or storage systems.

As mentioned above, within the harmonized governance system, for each of the respective ones of the individual agile environments that make up the heterogeneous agile environment, the computer-based PAE may maintain harmonized mappings of the abstracted and normalized representations of the individual agile environments and their respective resources, as well as respective attributes thereof, and corresponding equivalent agile environment-specific resources. These mappings may be stored in the one or more data sources.

Further, for each of the respective ones of the individual agile environments that make up the heterogeneous agile environment, the computer-based PAE maintains harmonized mappings of the abstracted and normalized operations, and respective attributes of said operations, capable of being performed by the resources of the respective individual agile environments and corresponding equivalent agile environment-specific operations. These mappings too may also be stored in the one or more data sources.

Finally, for each of the respective ones of the individual agile environments that make up the heterogeneous agile environment, the computer-based PAE maintains harmonized mappings of the abstracted and normalized roles, and respective attributes of said roles, assignable to subjects that will interact with said individual agile environments and resources thereof and corresponding equivalent agile environment-specific roles. These mappings may also be stored in the one or more data sources. An abstracted role is typically made up of a set of abstracted operations. Thus, the present invention provides a harmonized set of roles mapped to abstracted operations that span any resource (subject, application, system, etc.).

These various mappings provide for uniformity and consistency across different agile environments. For example, the use of a single set of labels across different agile environments for operations, objects, etc., frees administrators from the burden of having to know and maintain agile environment-specific syntaxes for such items. The mappings may also provide for many-to-one relationships, collapsing what may be multiple instructions/labels in an agile environment-specific syntax into a single operation/label in the abstract, normalized syntax of the heterogeneous agile environment afforded by the present invention. At the same time, underlying agile environment-specific granularity may be retained by allowing for optional attributes to be specified within the abstract, normalized representation.

The abstraction adopted in accordance with the present invention also normalizes agile environment-specific syntaxes across different methods of invoking similar operations. For example, some agile environments permit management through API calls, while others demand use of command line interfaces. By abstracting these distinctions, the present invention masks the underlying requirements and allows an administrator to focus on the desired operations, rather than the methods by which those operations have to be invoked for a given agile environment. Further, the abstraction provided in accordance with the present invention allows for specification of risk levels associated with invoking desired operations. For example, new attributes of operations, not available in agile environment-specific syntaxes, that specify the risk level associated with a command or instruction can be included and used as a means of alerting administrators and other subjects to the potential damage or harm posed by an intended operation. Thus, the present invention allows for harmonized management, reporting, and auditing across heterogeneous agile environments.

In accordance with embodiments of the present invention, a harmonized governance system for a heterogeneous agile environment that includes a number, n, of individual resources, each comprising one or more agile environments composed of compute systems, network systems, management systems, application containers, application systems, and/or storage systems, may receive an indication of an attempted operation concerning a resource of a first one of the individual agile environments; map the indication of the attempted operation concerning the resource from an agile environment-specific language of the first individual agile environment to an abstracted, normalized language of the heterogeneous agile environment; make a decision whether to allow or not allow the attempted operation; translate the decision from the abstracted, normalized language of the heterogeneous agile environment to a command in the agile environment-specific language of the first individual agile environment; and transmit the command in the agile environment-specific language of the first individual agile environment to an ACS (or similar management element) in the first individual agile environment for execution by that ACS. Reports concerning the attempted operations concerning resources of the n, individual, agile environments may be provided in the abstracted, normalized language of the heterogeneous agile environment via a dashboard thereof, and/or such reports may be sent by email or other means.

Generally, indications of any such attempted operations will include indications of actions to be performed on or by resources of the n, individual, agile environments. Thus, making decisions as to whether to authorize or not authorize such attempted operations involves determining whether respective policies governing the attempted operations concerning the resources permit such attempted operations. Such policies may be regarded as governance policies, and may include role-based access control policies, attribute-based access control policies, placement-policies, and/or relationship policies.

As explained further below, the abstracted, normalized language of the heterogeneous agile environment includes abstracted, normalized representations of subjects, resources, and operations. More generally, in accordance with the present invention there is provided, for each resource type, a well-defined set of abstracted, normalized operations that is agile environment-agnostic (or, agile environment provider-agnostic). Examples of such operations and roles based thereon are provided in Table 1. Such roles based on abstracted and normalized operations are applicable across disparate management platforms.

TABLE 1

Examples of abstracted operations and roles a. Example abstracted operation on a Virtual Machine

| Virtual Machine (VM) - Normalized, Abstracted Operations | Description |
|---|---|
| compute.vm.create | Create a VM |
| compute.vm.edit | Edit the configuration of a VM |
| compute.vm.power_on | Power on a VM |

TABLE 1-continued

Examples of abstracted operations and roles b. Example abstracted operations on a Container resource

| Container - Normalized, Abstracted Operations | Description |
|---|---|
| compute.container.create | Create a Container |
| compute.container.power_off | Stop a Container |
| compute.container.power_on | Start a Container | c. Example abstracted operations on a Network router

| Network Router - Normalized, Abstracted Operations | Description |
|---|---|
| network.router.create | Create a router |
| network.router.edit | Edit the configuration of a router |
| network.router.delete | Delete a router | d. Example abstracted roles that are based on such abstracted operations

| Role | Privileges/Permissions |
|---|---|
| VM_Admin | compute.vm.create, compute.vm.edit |
| VM_User | compute.vm.power_on |

In addition to the set of abstracted, normalized operations, the present invention also provides abstracted representation of resources that are normalized across heterogeneous agile environments. For example, an object called Virtual Machine may be defined such that it consistently represents an AWS EC2 instance, or VMWare VM instance, or an OpenStack server. Furthermore, abstracted, normalized attributes for both subjects and resources are provided, and may be categorized, for example:

a. Static—representing static characteristics such as guest operating system type, hardware type, classification, etc.
  b. Ephemeral—representing dynamic characteristics such as trust level, vulnerability, posture, patch version, geographic location, etc.

Such attributes may be discovered and/or computed based on patterns.

The harmonized governance system also supports fine-grained rules with suitable constraints based on a subject's and a resource's context. A rule is defined to be an association between a role and a group that represents a set of subjects. Optionally, one or more constraints may be defined for a rule to enable further segregation(s). Such constraints may represent expressions/queries, based on the abstracted attributes discussed above.

To enable automation in large scale environments some or all of following techniques may be used when defining rules:

a. Inheritance: Inheritance provides the ability to define a rule, assign it to a container/collection, and have the rule applied to all members of the collection automatically. For example, if one defines a rule to specify who is authorized to power off a VM and associates the rule with a VM Folder that represents a set of VMs, then through inheritance that rule would automatically apply to all VMs that belong to that folder. Inheritance of this sort may be extended to provide the ability to define dynamic collections. For example, a dynamic VM collection could be defined to be the list of all VMs that have a classification attribute set to "Top Secret." In this case, as and when new VMs are created and their classification attribute set to Top Secret, the rule would be automatically applied thereto.

b. Propagation: Propagation provides the ability to define a rule at a particular level, say at a root node of a tree representing a hierarchy of resources, and have the rule automatically applied to all the descendants of the root node. For example, one may apply a rule to a resource representing a management system and automatically propagate it to all the resources managed by that management system.

c. Precedence: Precedence dictates an order in which a rule should be evaluated and may indicate whether a particular rule is the only rule that has to be processed on a given resource. Thus, precedence may limit the number (and, perhaps nature) of rules that need to be evaluated/applied to resolve an authorization or placement decision. This allows for improved performance in a large scale, heterogeneous agile environment.

d. Embedded: In a dynamic environment, resources can potentially move from one environment to another, and/or be restored from an archived/backup version, and/or instantiated from pristine master templates. In all these scenarios attributes and/or rules may be embedded as meta-data, and read/updated at the time of instantiation.

e. Pre-configured yet customizable rules: The notion of pre-configured and yet customizable rules facilitates security automation, thereby enabling management of large and dynamic environments. At initialization, default policy templates tailored for respective resources may be made available. For example, in the case of policy templates for virtual machines that describe subjects that can perform defined operations, as and when VMs are instantiated the default rules may be automatically applied. In some embodiments, the default rules may be parameterized such that at the time the rule is associated with a resource, parameterized attributes may be replaced with actual values. For example, in the case of a rule with an associated constraint defined according to a parameterized label ($label), when the rule is applied to a VM the $label would be replaced by an actual value (e.g., location=MTV).

An example of a rule is given in Table 2.

TABLE 2

Example of a Rule

| Rule | Role | Group | Attribute-Based Constraint |
|---|---|---|---|
| MTV_VM_Admin_Rule | VM_Admin | MTV_Admin_Group | VMs in Mountain View Region |

For each individual agile environment, a map of all the agile environment-specific operations and the corresponding equivalent abstract operation is maintained. As specified above, such mappings are stored in one or more data stores accessible to components of the harmonized governance system. Table 3 provides an example of such a mapping.

TABLE 3

Example of mapping between an agile environment-specific operation and its corresponding equivalent abstract operation

| Abstract Operation | Vendor Operation (VMware) | Vendor Operation (OpenStack) | Vendor Operation (AWS) |
|---|---|---|---|
| compute.vm.create | create_VM_Task | Post ../../server | aws ec2 create_instance |
| compute.vm.edit | modify_VM_Task | Patch ../../server | aws ec2 modify_instance |

Such mappings are created manually and/or automatically by inspecting API requests and responses that correspond to various operations.

Figure 3:
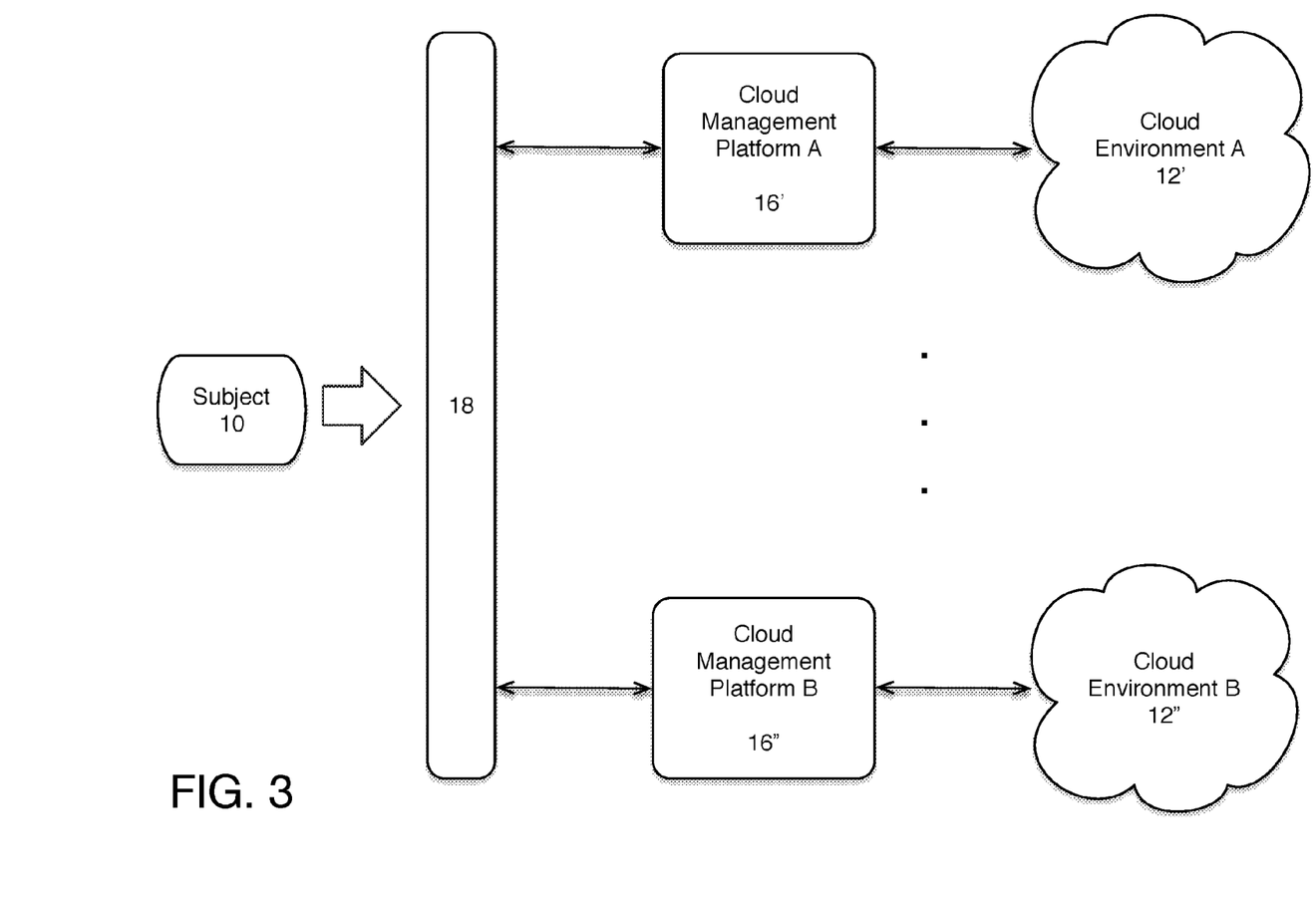
FIG. 3 depicts an example of a managed heterogeneous agile environment in accordance with some embodiments of the invention.

FIG. 3 illustrates an example of a harmonized governance system 18 interposed between a subject 10 and heterogeneous cloud resources A 12' and B 12" via respective cloud management platforms 16' and 16". Instead of the different cloud resources being managed via separate, respective ACSes, service requests by subject 10 are sent via the harmonized governance system 18 to the respective cloud management platforms for the respective cloud resource. This means that an administrator is freed from having to understand the cloud environment-specific management platforms used to manage the different cloud resources, as well as the associated authorization policies of the different environments, user interfaces and/or application programming interfaces, thereof. Instead, the administrator may make use of the harmonized governance system to manage the heterogeneous agile environment that includes the plurality of individual agile environments (cloud resources A 12' and B 12" in this example). The harmonized governance system maps indications of attempted operation concerning resources of the individual agile environments from agile environment-specific languages thereof to an abstracted, normalized language. Further, the harmonized governance system makes a decision whether to allow or not allow the attempted operation; and, if the decision is to allow the attempted operation, translates the decision from the abstracted, normalized language of the heterogeneous agile environment to a command in the agile environment-specific language of the individual agile environment of which the intended resource is a part, and transmits the command in the agile environment-specific language of that individual agile environment to an ACS (or similar management element) in the management platform of the individual agile environment for execution. Thus, the harmonized governance system acts as a single facility for administering access control policies across multiple, heterogeneous agile environments. Policies for those heterogeneous agile environments are defined centrally, based on abstracted operations and the harmonized governance system translates user operations on resources to abstracted operations and performs the necessary enforcements. The harmonized governance system can act as a centralized PEP or work with the existing PEPs from the various access control systems of the individual agile environments by suitably provisioning access control information to the respective systems.

Figure 4:
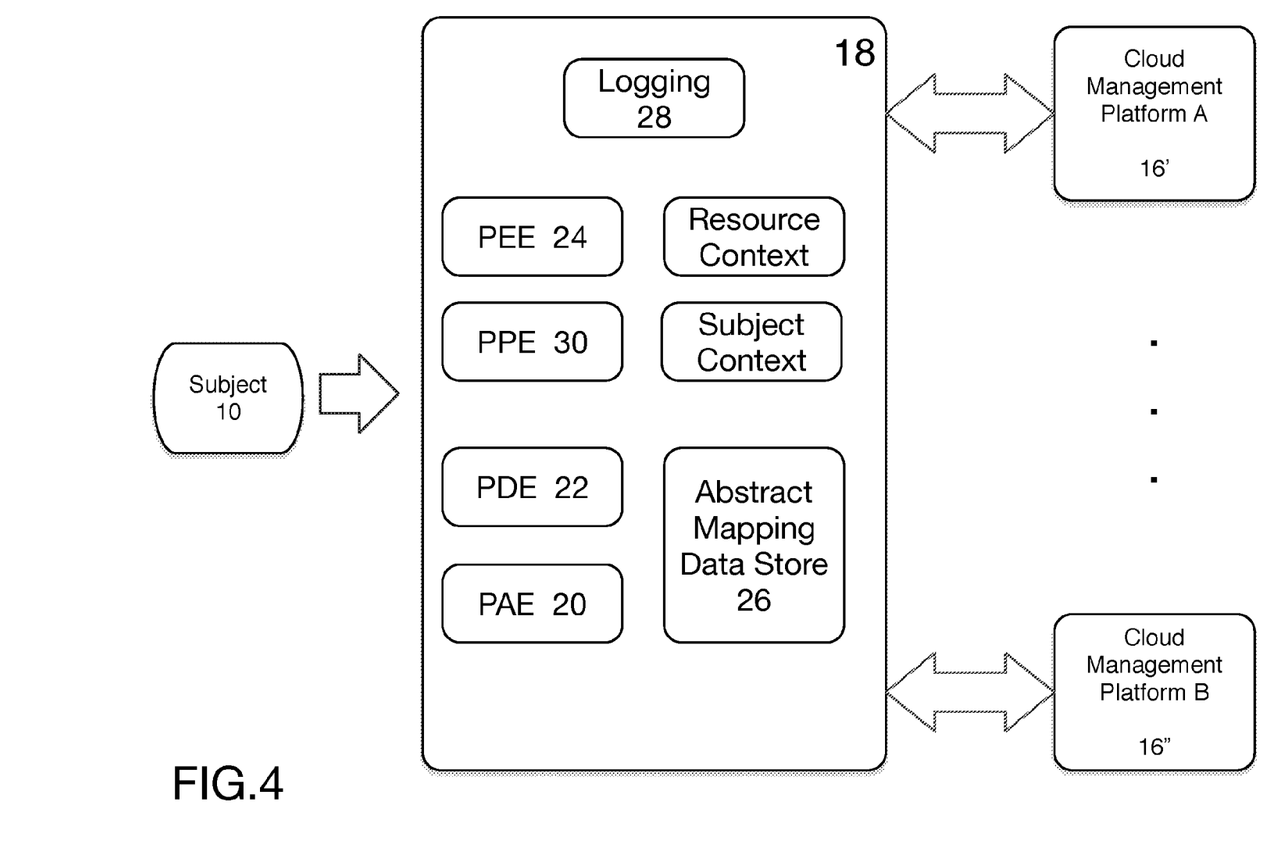
FIG. 4 depicts an example of a harmonized governance system for a heterogeneous agile environment in accordance with some embodiments of the invention.

FIG. 4 illustrates the harmonized governance system 18 in greater detail. As shown, the harmonized governance system includes a computer-based policy administration element (PAE) 20. Using the PAE, an administrator may define roles, rules, abstract operations, abstract operation-to-agile environment-specific operation mappings, and may assign rules to various resources. Such definitions and assignments may be facilitated through web-based UIs, CLIs or programmatically thru a RESTful API, for example. PAE 20 is communicatively coupled to the respective management platforms 16', 16" of the various individual agile environments and is configured to administer and report governance policies of the harmonized governance system as described above.

The harmonized governance system also includes a computer-based policy decision element (PDE) 22, which is communicatively coupled to receive indications of attempted governance operations by one or more subjects 10 to resources within the individual agile environments that make up the heterogeneous agile environment. The PDE is configured to determine and report whether such attempted governance operations should be permitted or not. Typically, the policy enforcement element (PEE) 24 consults the PDE for the decision and suitably enforces it. The PEE would provide the PDE with information about the subject, the operation being performed by the subject and the information about the resource(s) on which the operation is being performed. The PDE then makes a decision by mapping the PEE-supplied operation to a suitable normalized, abstracted operation, leveraging the appropriate abstract operation-to-agile environment-specific operation mapping data store 26; prepares a list of all applicable rules that needs to be evaluated by consulting the PAE; and processes the rules (in the order of precedence, if appropriate) to determine action(s) to be taken. Processing a rule would amount to determining if a given subject in a respective role has the ability to perform the desired operation on the indicated resource(s). A role is made of a set of abstracted operations that can be performed by a subject belonging to that role.

The computer-based PEE 24 is communicatively coupled to the respective management platforms and/or resources of the individual agile environments that make up the heterogeneous agile environment and is configured to enforce and report authorization decisions of the PDE. The PEE may, in some embodiments, be implemented as a transparent proxy engine that intercepts all incoming requests to the agile environment management platforms (i.e., the operations being performed by a subject against a resource). The PEE passes relevant information to the PDE as described above to determine if the operations should be allowed. Based on the decision, the PEE allows or denies the request. Details of such transactions may be logged 28 by the harmonized governance system.

An alternate method of implementing policy authorization and enforcement would be to leverage the policy infrastructures in the respective cloud management platforms 16', 16" for both determining authorization decisions as well as the enforcement of the same. For this to work, the rules and other policy artifacts as defined using the PAE have to be suitably translated to respective cloud management platform-specific representations and such artifacts needs to be provisioned to the cloud management platforms. An optional policy provisioning element (PPE) 30 may be responsible for the same.

In some circumstances, the harmonized governance system may receive information concerning a resource of an individual agile environment that does not have an existing mapping to an abstracted, normalized representation thereof. For example, a particular agile environment vendor may add an object attribute not previously defined for that environment. In such a case, the discovery of this new, previously unmapped attribute may cause the PDE to alert the PAE to the unmapped attribute. Once so alerted, the PAE may analyze the new attribute in an attempt to classify it. For example, the PAE may categorize the new attribute according to its association with the corresponding object as being network-related, compute-related, etc. So categorized, the PAE may alert the administrator to the new attribute and suggest likely (or possible) categories for the attribute and the administrator may select from among the choices to define the new attribute and bind it to a mapping in the abstract, normalized syntax of the harmonized governance system. The new mapping is then saved to the appropriate data store, where it is available for future use. The new mapping will also be associated with operations applicable to the new attribute (e.g., create, run, delete, etc.). Going forward, when similar attributes are discovered for others of the agile environments, those new attributes can be mapped to the new abstracted representation. This process can also be applied in the case of newly discovered objects, subjects, resources, etc.

For example, within the syntax of the harmonized governance system for a given resource type (say "vm") of a given category (say "compute"), there may be defined operations such as "edit," "create," and "delete." Thus, an operation may be expressed as compute.vm.edit, or compute.vm.create, etc. Attributes may exist at various levels of this expression. For example, attributes of an operation may include "CPU" (which may also have attributes of "min" and "max" threshold, etc.). Attributes of a resource type may include an IP address, name, etc. Categories are common elements across agile environments. When a new attribute of a resource type is discovered, the system will identify it by its properties (e.g., a name-value pair) and suggest (e.g., on the basis of contextual information available to the PAE) categories to which the new attribute can be assigned. The administrator can define the mapping using the suggested category, or a different category, and the mapping is saved to the appropriate data store. Thereafter, when similar attributes in others of the agile environments are recognized, those attributes can be assigned to the newly created mapping so as to preserve the abstracted, normalized syntax of the harmonized governance system.

Figure 5:
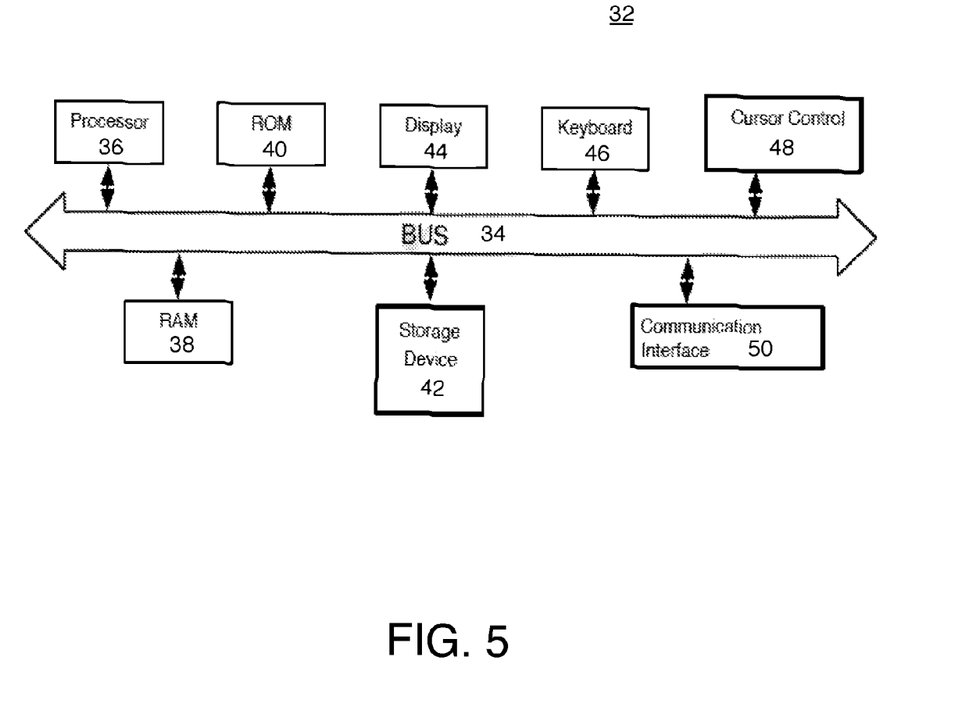
FIG. 5 depicts an exemplary computer system in accordance with some embodiments of the invention.

In the foregoing description, certain processes have been described. In an actual implementation of the present invention, the steps that make up such processes can be event-driven routines that can run in parallel and can be launched and executed in various sequences. Further the procedures described herein may involve the use of various computer systems and computer readable storage media having computer-readable instructions stored thereon. FIG. 5 provides an example of a computer system 32 that is representative of any of the computer systems or electronic devices discussed herein. Note, not all of the various computer systems may have all of the features of computer system 32. Computer systems such as computer system 32 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 32 includes a bus 34 or other communication mechanism for communicating information, and a processor 36 coupled with the bus for processing information. Computer system 32 also includes a main memory 38, such as a random access memory (RAM) or other dynamic storage device, coupled to the bus for storing information and instructions to be executed by the processor. Main memory 38 also may be used for storing temporary variables or other intermediate information during execution of instructions to be executed by processor 36. Computer system 32 further includes a read only memory (ROM) 40 or other static storage device coupled to the bus for storing static information and instructions for the processor 36. A storage device 42, which may be one or more of a hard disk, flash memory-based storage medium, or other storage medium, is provided and coupled to the bus for storing information and instructions (e.g., operating systems, applications programs and the like).

Computer system 32 may be coupled via the bus 34 to a display 44, such as a liquid crystal or light emitting diode display, for displaying information to a user. An input device 46, such as a keyboard including alphanumeric and other keys, is coupled to the bus for communicating information and command selections to the processor. In some embodiments, the keyboard will be a software construct rendered via a touch screen display. Another type of user input device is cursor control device 48, such as a mouse, a trackball, cursor direction keys, and/or any other input device for communicating direction information and command selections to processor 36 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented using processor 36 executing appropriate sequences of computer-readable instructions contained in main memory 38. Such instructions may be read into main memory from another computer-readable medium, such as storage device 42, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 36 and its associated computer software instructions to implement the invention. The computer-readable instructions may be rendered in any computer language and unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 32 or similar electronic computing device, that manipulates and transforms data represented as physical (electronic) quantities within its registers and memories into other data similarly represented as physical quantities within its memories or registers or other such information storage, transmission or display devices.

Computer system 32 also includes a communication interface 50 coupled to the bus 34. Communication interface 50 provides a two-way data communication channel with a computer network, such as a network, which provides connectivity to and among the various servers discussed above. For example, communication interface 50 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 32 can send and receive messages and data through the communication interface and in that way communication with hosts accessible via the Internet. Computer system 32 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 32, and are often characterized by having storage mediums capable of accommodating significant amounts of information.

While the preferred embodiments have been shown and described, it will be understood that these were presented by way of example and the invention should only be measured by the claims, which follow.

What is claimed is:

1. A harmonized governance system for a heterogeneous agile environment, comprising:
    one or more computing devices configured as:
        a computer-based policy administration element (PAE) communicatively coupled to respective management platforms of a plurality of individual agile environments that make up the heterogeneous agile environment, the PAE configured to administer and report governance policies, including rules, roles and assignment to resources of the heterogeneous agile environment according to abstracted and normalized (i) representations of the resources, (ii) operations which are performed by and on said resources, and (iii) roles assignable to one or more subjects that will interact with said resources, and (iv) respective attributes of said representations, operations and roles; and
        a computer-based policy decision element (PDE) communicatively coupled to receive indications of attempted governance operations by the one or more subjects to resources within the individual agile environments that make up the heterogeneous agile environment, the PDE configured to determine and report whether the attempted governance operations should be permitted or not;
    one or more data sources accessible to the PAE and the PDE storing information about (i) the one or more subjects and respective attributes thereof, and (ii) resources of the heterogeneous agile environment and respective attributes of said resources,
    wherein different respective ones of the individual agile environments that make up the heterogeneous agile environment have individual, associated access policies for resources within the respective individual agile environments; each respective individual agile environment has an associated, respective access control system for subjects, resources, and operations of the respective individual agile environment; and the resources of each respective individual agile environment comprise one or more of computer systems, network systems, application containers, application systems, management systems, and storage systems,
    wherein the PAE is further configured to (i) in response to receiving a new attribute concerning a resource of an individual agile environment that is not yet mapped to an abstracted, normalized attribute of the heterogeneous agile environment, mapping the new attribute to the abstracted, normalized attribute, and saving the mapping of the new attribute to the one or more data sources, (ii) in response to receiving a new operation concerning a resource of the individual agile environment that is not yet mapped to the abstracted, normalized operation of the heterogeneous agile environment, mapping the new operation to the abstracted, normalized operation, and saving the mapping of the new operation to the one or more data sources, and (iii) define new abstracted access control policies based on the abstracted roles, abstracted operations and abstracted resources.

2. The harmonized governance system of claim 1, wherein for each of the respective ones of the individual agile environments that make up the heterogeneous agile environment, the computer-based PAE maintains harmonized mappings of the abstracted and normalized representations of the resources, and respective attributes of said resources, of the respective individual agile environments and corresponding equivalent virtualized agile environment-specific resources, said mappings stored in the one or more data sources.

3. The harmonized governance system of claim 1, wherein for each of the respective ones of the individual agile environments that make up the heterogeneous agile environment, the computer-based PAE maintains harmonized mappings of the abstracted and normalized operations, and respective attributes of said operations, which are performed by said resources of the respective individual agile environments and corresponding equivalent agile environment-specific operations, said mappings stored in the one or more data sources.

4. The harmonized governance system of claim 1, wherein for each of the respective ones of the individual agile environments that make up the heterogeneous agile environment, the computer-based PAE maintains harmonized mappings of the abstracted and normalized roles, and respective attributes of said roles, assignable to subjects that will interact with said resources of the respective individual agile environments and corresponding equivalent agile environment-specific roles, said mappings stored in the one or more data sources.

5. The harmonized governance system of claim 4, wherein the abstracted and normalized roles comprise abstracted operations which are performed by said resources of the respective individual agile environments.

6. The harmonized governance system of claim 1, further comprising:
    a computer-based policy enforcement element (PEE) communicatively coupled to the respective management platforms and resources of the individual agile environments that make up the heterogeneous agile environment, the PEE configured to enforce and report authorization decisions of the PDE.

7. The harmonized governance system of claim 1, further comprising:
    a computer-based policy provisioning element (PPE) configured to translate the abstracted, normalized access control policies defined by the PAE into respective management platform-specific access control policies, and provision the management platform-specific access control policies to the respective management platforms.

8. A method comprising:
    receiving, at a harmonized governance system for a heterogeneous agile environment that includes a number, n, of individual agile environments each comprising one or more computer systems, network systems, application containers, application systems, management systems, and storage systems, an indication of an attempted operation concerning a resource of a first one of the individual agile environments, and wherein the number, n, of individual agile environments each have individual, associated access policies for resources within the respective individual agile environments; and each respective individual agile environment has an associated, respective access control system for subjects, resources, and operations of the respective individual agile environment;

mapping the indication of the attempted operation concerning the resource from an agile environment-specific operation of the first one of the individual agile environments to an abstracted, normalized operation of the heterogeneous agile environment;

the harmonized governance system of the heterogeneous agile environment making a decision whether to allow or not allow the attempted operation;

in response to the attempted operation being allowed, translating the abstracted, normalized operation of the heterogeneous agile environment to the agile environment-specific operation of the first one of the individual agile environments;

transmitting the agile environment-specific operation of the first one of the individual agile environments to a management platform of the first one of the individual agile environments for execution thereby;

in response to receiving a new attribute concerning a resource of an individual agile environment that is not yet mapped to an abstracted, normalized attribute of the heterogeneous agile environment, mapping the new attribute to the abstracted, normalized attribute, and saving the mapping of the new attribute to one or more data sources; and in response to receiving a new operation concerning a resource of an individual agile environment that is not yet mapped to an abstracted, normalized operation of the heterogeneous agile environment, mapping the new operation to the abstracted, normalized operation, and saving the mapping of the new operation to one or more data sources; and defining new abstracted access control policies based on the abstracted roles, abstracted operations and abstracted resources.

9. The method of claim 8, further comprising reporting the abstracted, normalized operation of the heterogeneous agile environment to an administrator of the harmonized governance system.

10. The method of claim 9, wherein said reporting is via one of: a dashboard or a transmitted report.

11. The method of claim 8, wherein the indication of the attempted operation concerning the resource of the first one of the individual agile environments comprises an indication of an action to be performed on or by the resource.

12. The method of claim 8, wherein making the decision whether to authorize or not authorize the attempted operation comprises determining whether policies governing the attempted operation concerning the resource permit said attempted operation.

13. The method of claim 12, wherein the policies governing the attempted operation concerning the resource comprise one or more of governance policies, role-based access control policies, attribute-based access control policies, placement-policies, and relationship policies.

* * * * *